Dec. 22, 1936.                F. M. DAVIS                2,065,173
                    MILLING MACHINE SPINDLE MOUNTING
                        Filed Nov. 4, 1935         2 Sheets-Sheet 1
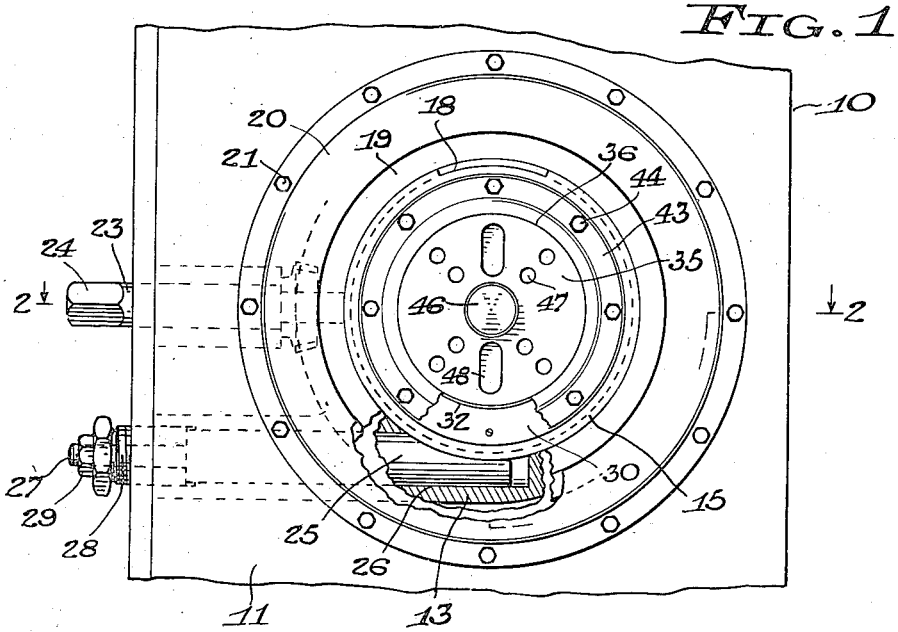
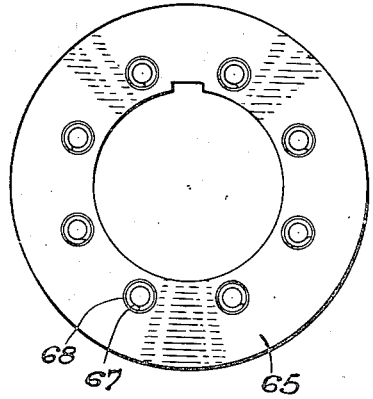
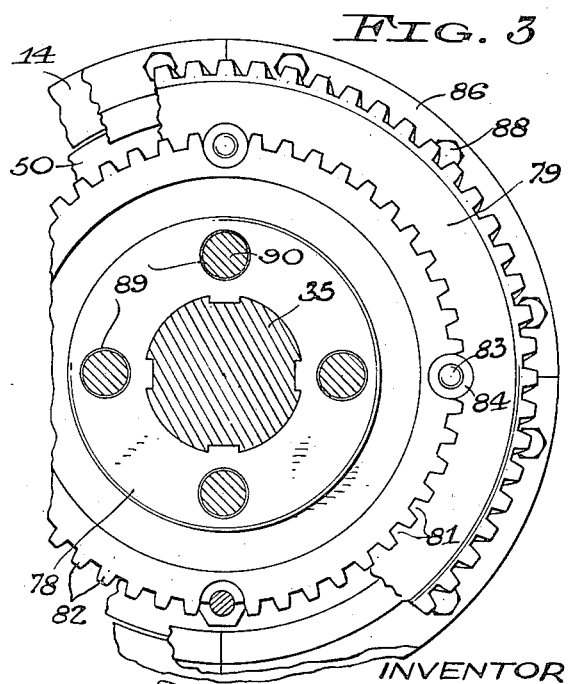

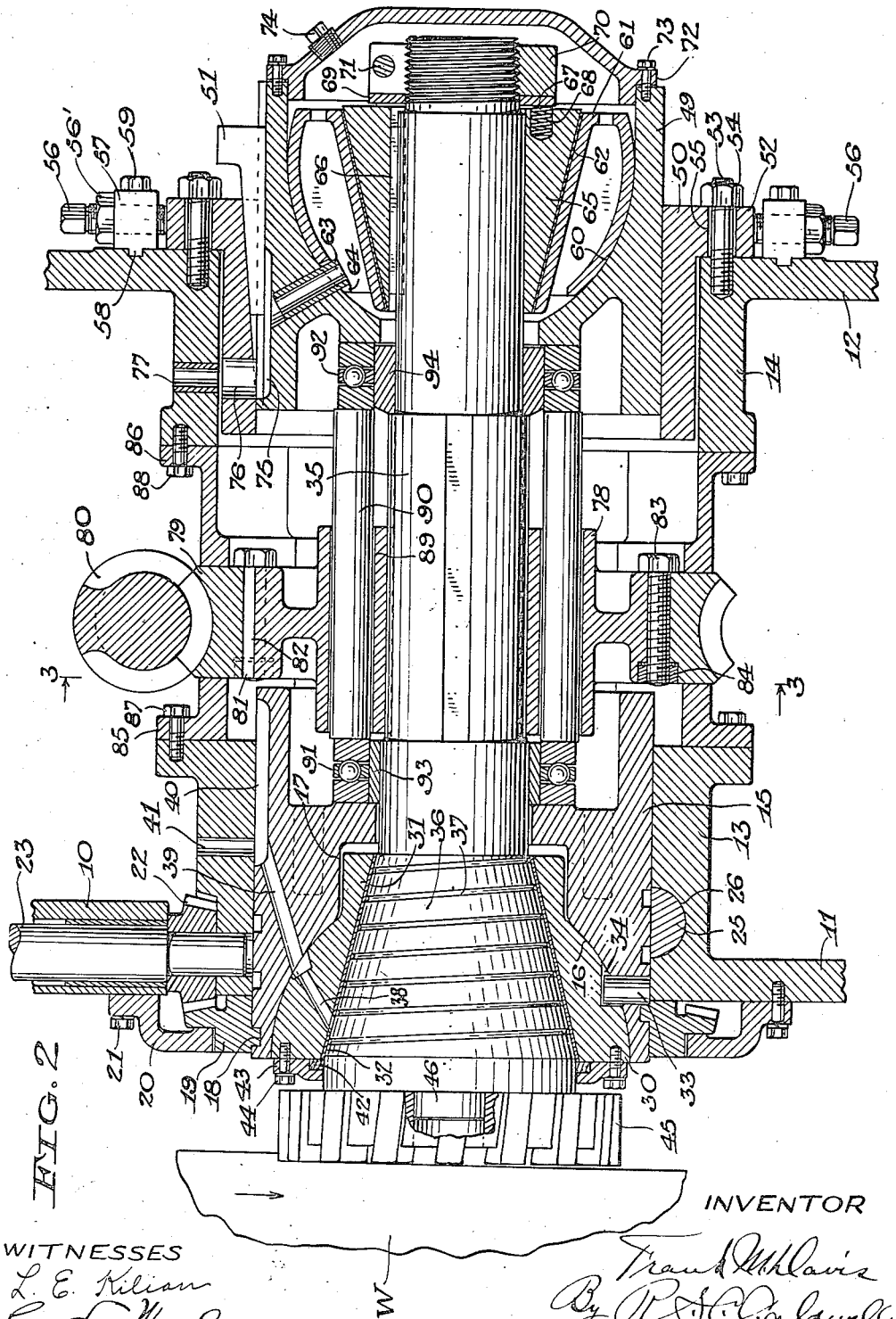

Patented Dec. 22, 1936

2,065,173

UNITED STATES PATENT OFFICE 2,065,173

MILLING MACHINE SPINDLE MOUNTING

Frank M. Davis, Milwaukee, Wis., assignor to Davis and Thompson Company, West Allis, Wis., a corporation of Wisconsin Application November 4, 1935, Serial No. 48,124

15 Claims. (Cl. 90—11)

The invention relates to spindle mountings and more particularly to mountings for milling machine spindles.

An object of the invention is to provide a mounting for a milling machine spindle by which the spindle can readily and accurately be adjusted to place the axis thereof in different angular positions, whereby to vary the amount of toe cut clearance in face milling.

Another object of the invention is to provide a spindle mounting having simple but effective means for driving and longitudinally adjusting the spindle.

A further object is to provide a spindle mounting which can readily be assembled and disassembled.

A still further object is to provide a spindle mounting having means for compensating for thermal expansion of the parts.

The invention further consists in the several features hereinafter described and claimed.

In the accompanying drawings, illustrating one specific embodiment of the invention, Fig. 1 is an end view of a milling machine spindle mounting constructed in accordance with the invention, the milling cutter being removed, and parts being broken away and parts being shown in section;

Fig. 2 is a sectional view of the spindle mounting taken generally along the line 2—2 of Fig. 1, the spindle having a cutter thereon, parts thereof being broken away and parts being shown in section;

Fig. 3 is a sectional view taken on the line 3—3 of Fig. 2, and

Fig. 4 is an end view of a bearing collar for the spindle.

In these drawings, 10 designates a frame or support of a milling machine, the frame being preferably in the form of a housing having spaced parallel walls 11 and 12 provided with aligned inwardly projecting tubular portions 13 and 14, respectively, the inner ends of which are spaced apart. Slidably fitting in the opening or bore of the tubular portion 13 and retained therein against relative rotation is a quill or sleeve 15 having a spherically formed socket 16 in its outer end, the inner end of the socket having a cylindrical extension 17. The outer cylindrical surface of the quill has formed therein a screw thread 18 engaged by a surrounding nut-forming ring gear 19 bearing against the outer face of the frame wall 11, the ring gear being held against the frame wall by a retainer ring 20 secured by screws 21 to the frame wall. For longitudinally shifting the quill, the ring gear 19 is angularly adjusted by a bevel gear 22 meshing therewith and carried on the inner end of a shaft 23 journalled in the frame, the shaft extending radially of the quill and having a squared outer end 24 to receive a wrench or other suitable tool. The quill is locked in position by a wedge 25 engaging its outer surface, the wedge being here shown in the form of a cylindrical rod slidably fitting in a bore 26 extending in the frame tangentially of the outer surface of the quill, the rod having its inner end cut away to a concave shape to engage the quill. The wedge rod has a reduced shouldered outer end 27 slidably extending through a bushing 28 screw-threaded into the frame, the inward displacement of the bushing forcing the wedge rod against the quill. The wedge rod is secured to the bushing by a nut 29.

A bearing member 30 has a spherically formed outer surface pivotally fitting in the spherically formed socket 16 in the quill, and has a cylindrical inner extension 31 loosely fitting in the extension space 17 in the quill. The inner surface of the bearing member is conically formed and has a bearing metal liner 32. The bearing member 30 is restrained against rotation by one or more radial pins 33 mounted in the quill and loosely fitting in recesses 34 formed in the spherical outer surface of the bearing member.

A spindle 35 has a flaring conically formed end portion 36 rotatably fitting in the bearing member 30, the conical surface of the spindle having a spiral oil groove 37 for conducting oil toward the smaller diameter of the conically formed portion. An oil duct 38 in the bearing member 30 opens near the larger end of the conical bearing and has an enlarged outer end communicating with an oil duct 39 in the quill, the duct 39 joining a channel 40 formed longitudinally in the cylindrical outer surface of the quill. Oil is admitted to the channel 40 through a bore 41 in the tubular portion 13 of the frame and flows by gravity to the bearing surfaces. A packing ring 42 bears on the outer cylindrical end of the spindle near the conical surface and is held by a retainer ring 43 secured to the outer end of the bearing member 30 by screws 44.

The outer end of the spindle detachably carries thereon a milling cutter 45 of the face milling type, the end of the spindle having the usual centering boss 46 for the cutter, and the end face of the spindle having the usual tapped holes 47 and keyways 48 for the cutter-securing means.

A quill or sleeve 49 extends into the tubular portion 14 of the frame and slidably fits in an annular member or bushing 50 to which it is detachably secured against relative rotation by a tapered drive key 51. The bushing 50 fits loosely in the tubular portion 14 and has an out-turned flange 52 at its outer end secured by a plurality of studs 53 and nuts 54 to the outer face of the frame wall 12, the studs passing loosely through openings 55 in the flange. The bushing 50 is adjustable laterally by a pair of diametrically opposite radially extending jack screws 56 engaging the outer edge of the bushing flange and threaded through blocks 57 rigidly secured to the frame wall 12, the blocks being keyed at 58 to the frame wall and clamped thereto by screws 59. The jack screws carry lock nuts 56′ engageable with the blocks.

The quill 49 has a spherically formed socket 60 in its outer end in which pivotally fits the spherically formed outer surface of a hollow internally ribbed bearing member 61. The inner surface of the bearing member 61 is conically formed and has a bearing metal liner 62. The bearing member 61 is restrained against rotation by an oil tube 63 in the quill 49 entering a notch or recess 64 in the spherical portion of the bearing member.

A bearing collar or journal member 65 is slidably mounted on a cylindrical portion of the spindle 35 and has a conically formed outer surface fitting in the bearing member 61. A key 66 prevents relative rotation between the spindle and bearing collar. The bearing collar 65 is urged inwardly against the bearing member 61 by coiled compression springs 67 housed in bores 68 formed in the outer end of the collar and bearing against a washer 69 surrounding the spindle, the washer being held on the spindle by a split clamping nut 70 which is screw threaded onto the reduced rear end of the spindle and has a locking screw 71. The rear end of the spindle is enclosed by a cover plate 72 secured by screws 73 to the outer end of the quill 49, the cover plate having a screw-threaded oil-hole plug 74. The oil tube 63 communicates at its outer end with an oil channel 75 formed longitudinally in the outer surface of the quill 49, oil being admitted to the channel through aligned openings 76 and 77 formed in the bushing 49 and tubular frame portion 14, respectively.

The intermediate portion of the spindle has splined thereon the hub portion of a drive member 78 which has detachably secured thereon a ring gear 79, here shown to be a worm gear meshing with a driving worm 80. The driving connection between the ring gear 79 and drive member 78 preferably comprises internal gear teeth 81 on the ring gear interfitting with external gear teeth 82 on the drive member, the ring gear and drive member 78 being confined against relative axial movement by bolts 83 extending parallel to the gear teeth adjacent the pitch circle, the bolts being threaded into nuts 84 countersunk into the ring gear and drive member. The ring gear 79 is confined against axial movement by spacers 85 and 86 at opposite sides having out-turned flanges secured by screws 87 and 88, respectively, to the inner ends of the tubular portions 13 and 14 of the frame. The spacers 85 and 86 are preferably in the form of segmental rings so as to facilitate assembly and disassembly of the parts and to close the space between the tubular housing portions 13 and 14. In cases where it is unnecessary to completely close the space between the tubular frame portions, one of each of the spacer segments 85 and 86 is sufficient to confine the ring gear 79 against axial movement, the two retained spacer segments being preferably those adjacent the worm 80. The internal diameter of the ring gear 79 is slightly larger than the quill 15 so as to permit passage of the quill through the gear.

The hub of the drive member 78 has formed therein a plurality of bores 89 extending parallel to the axis. Rods 90 pass loosely through the bores 89 and bear at opposite ends on anti-friction thrust bearings 91 and 92 which are seated against inturned parts of the quills 15 and 49 respectively, the thrust bearings being carried on respective rings or collars 93 and 94 on the spindle. The coiled springs 67 are held under considerable pressure by the nut 70 on the rear end of the spindle, and the spring pressure is transmitted through the rods 90 and anti-friction bearings 91 and 92. The effect of the spring pressure is to take up all axial and radial play at the spindle, so as to avoid chattering, there being no danger of either binding or loosening under temperature changes.

The work W to be faced, such as a cylinder block, is moved relatively past one or more of the cutters in any suitable manner, as by means of a rotating carrier, not shown, one type of which is disclosed in my United States Letters Patent No. 1,279,286 for Duplex milling-machine, issued September 17, 1918.

In assembling the device, most of the parts, including the quills, can be mounted on the spindle, and the spindle assembly thus formed can be inserted into the frame or housing 11 through the tubular portion 14 of the frame, the front quill 15 passing through the bushing 50 and the ring gear 79, and the drive member 78 subsequently being meshed with the internal teeth of the ring gear. The bolts 83 are applied before completing the attachment of the segmental rings 85 and 86. For dismounting the spindle, the bolts 83 can be withdrawn after removing one or more of the segments of each of the rings 85 and 86. In withdrawing the spindle, the quill 15 will pass through the ring gear 79 and bushing 50.

In setting up the device for use, the rear portion of the spindle is shifted laterally a small distance by the jack screws 56, the axes of which are substantially parallel to the direction of travel of the work. The spherical bearings for the spindle permit this shift to be made without binding or diminution of the bearing area, and without appreciably affecting the driving connection for the spindle. The direction of shift is substantially parallel to the direction of work travel and opposite thereto, so as to position the face milling cutter for producing what is termed a toe cut, there being a small clearance between the finished part of the work and the idle cutting teeth, as indicated in Fig. 2, thus avoiding unnecessary drag on the cutter and scoring of the work. The amount of clearance depends on various factors, such as the kind of metal being cut and the depth of cut, and may vary, for example, from two-thousandths of an inch to six-thousandths of an inch per foot of cutter diameter. The depth of cut is adjusted by shifting the spindle axially by means of the nut-forming ring gear 19, the wedge 25 and drive key 51 being thereafter tightened to hold the adjustment.

In operation, the cutter spindle is driven by the worm 80 meshing with the ring gear 79 which transmits power through the drive member 78 splined on the spindle. The work W is advanced against the cutter in the direction indicated by the arrow, and the finished part of the work clears the idle teeth of the cutter. The rotation of the spindle causes oil to be fed inwardly along the spiral groove 37 on the spindle.

The spindle mounting not only permits the spindle to be tilted to different angular positions for face milling, but also permits the spindle to be squared with respect to the frame for other operations.

What I claim as new and desire to secure by Letters Patent is:

1. A spindle mounting, comprising supporting means having axially spaced spherically formed sockets, bearing members pivotally seated in said sockets, means for holding said bearing members in axial thrust engagement with said spherically formed sockets, a spindle journalled in said bearing members, means for driving said spindle, and means for angularly adjusting the axis of said spindle with respect to said supporting means.

2. A spindle mounting, comprising a support having an opening therein, a quill slidable in said opening and having a spherically formed socket, a bearing member seated in said socket, a spindle journalled in said bearing member, means for driving said spindle, a second quill axially spaced from said first-named quill and having a spherically formed socket, a second bearing member for said spindle seated in said last-named socket, and means for securing said second quill to said support and for laterally adjusting said quill to vary the angle of said spindle with respect to said support.

3. A spindle mounting, comprising a support having an opening therein, a quill slidable in said opening and having a spherically formed socket, a bearing member seated in said socket, a spindle journalled in said bearing member, means for driving said spindle, a second quill axially spaced from said first-named quill and having a spherically formed socket, a second bearing member for said spindle seated in said last-named socket, an annular member in which said second quill is slidably carried, means for releasably clamping said annular member to said support, and screw means for laterally adjusting said annular member to vary the angle of said spindle with respect to said support.

4. A spindle mounting, comprising supporting means, a pair of axially spaced bearing members carried by said supporting means, a spindle journalled in one of said bearing members and having an axial thrust engagement therewith, a journal member slidably but non-rotatably carried by said spindle and journalled in the other bearing member, means for urging said journal member into axial thrust engagement with said second bearing member, the axial thrust on said bearing members being toward each other, a drive member for said spindle positioned between said bearing members, and means passing through said drive member for resisting the axial thrust on said bearing members.

5. A spindle mounting, comprising supporting means, a pair of axially spaced bearing members carried by said supporting means, a spindle journalled in one of said bearing members and having an axial thrust engagement therewith, a journal member slidably but non-rotatably carried by said spindle and journalled in the other bearing member, means for urging said journal member into axial thrust engagement with said second bearing member, the axial thrust on said bearing members being toward each other, a drive member for said spindle positioned between said bearing members, and means including a plurality of rods passing through said drive member for resisting the axial thrust on said bearing members.

6. A spindle mounting, comprising a support, a pair of axially spaced bearing-holding members carried by said support and each having a spherically formed socket, bearing members seated in said sockets and each having a conically formed bearing surface, a spindle having a conically formed portion journalled in one of said bearing members, a journal member slidably but non-rotatably carried by said spindle and having a conically formed portion journalled in the other bearing member, the conically formed bearing surfaces of said bearing members converging toward each other, resilient means for urging said conically formed portions into axial thrust engagement with said bearing members, a drive member for said spindle positioned between said bearing-holding members, and means passing through said drive member for resisting the axial thrust on said bearing members and bearing-holding members.

7. A spindle mounting, comprising supporting means, a pair of axially spaced bearing members carried by said supporting means, a spindle journalled in one of said bearing members and having an axial thrust engagement therewith, a journal member slidably but non-rotatably carried by said spindle and journalled in the other bearing member, means for urging said journal member into axial thrust engagement with said second bearing member, the axial thrust on said bearing members being toward each other, a drive member for said spindle positioned between said bearing members and splined on said spindle, and means passing through said drive member for resisting the axial thrust on said bearing members.

8. A spindle mounting, comprising supporting means, a pair of axially spaced bearing members carried by said supporting means, a spindle journalled in one of said bearing members and having an axial thrust engagement therewith, a journal member slidably but non-rotatably carried by said spindle and journalled in the other bearing member, means for urging said journal member into axial thrust engagement with said second bearing member, the axial thrust on said bearing members being toward each other, a drive member for said spindle positioned between said bearing members, and resilient means for urging said journal member into axial thrust engagement with said second bearing member and for urging said spindle into axial thrust engagement with said first bearing member.

9. A spindle mounting, comprising supporting means, a pair of axially spaced bearing members carried by said supporting means, a spindle journalled in one of said bearing members and having an axial thrust engagement therewith, a journal member slidably but non-rotatably carried by said spindle and journalled in the other bearing member, means for urging said journal member into axial thrust engagement with said second bearing member, the axial thrust on said bearing members being toward each other, a drive member for said spindle positioned between said bearing members, said journal member having recesses therein, coiled springs in said recesses, and means carried by said shaft for holding said springs compressed to urge said journal member into axial thrust engagement with said second bearing member and to urge said spindle into axial thrust engagement with said first-named bearing member.

10. A spindle mounting, comprising a support having a pair of axially spaced openings, a member slidable in one of said openings and insertable through the second opening, bearing means carried by said member, a spindle journalled in said bearing means, a second bearing means for said spindle adjacent the second opening of the support, a ring gear between said openings and having an internal diameter larger than said first opening, and a drive member for said spindle positioned between said bearing means and having a detachable connection with said ring gear, said drive member when detached from said ring gear permitting the passage of said slidable member through said ring gear.

11. A spindle mounting, comprising a support having a pair of axially spaced openings, a member slidable in one of said openings and insertable through the second opening, bearing means carried by said member, a spindle journalled in said bearing means, a second bearing means for said spindle adjacent the second opening of the support, a ring gear between said openings and having an internal diameter larger than said first opening, a drive member for said spindle positioned between said bearing means and having a detachable connection with said ring gear, said drive member when detached from said ring gear permitting the passage of said slidable member through said ring gear, and means for preventing axial shifting of said ring gear.

12. A spindle mounting, comprising a support having a pair of axially spaced openings, a member slidable in one of said openings and insertable through the second opening, bearing means carried by said member, a spindle journalled in said bearing means, a second bearing means for said spindle adjacent the second opening of the support, a ring gear between said openings and having an internal diameter larger than said first opening, a drive member for said spindle positioned between said bearing means and having a detachable connection with said ring gear, said drive member when detached from said ring gear permitting the passage of said slidable member through said ring gear, and segmental spacers secured to said support for preventing axial shifting of said ring gear.

13. A spindle mounting, comprising supporting means, quill means slidable in said supporting means, means for retaining said quill means in axially adjusted position, a pair of bearing members carried by said quill means, a spindle journalled in said bearing members and having an axial thrust engagement therewith to avoid end play, and resilient means movable with said quill means for retaining said spindle in said axial thrust engagement with said bearing members.

14. A spindle mounting, comprising supporting means having a rounded socket, a bearing member pivotally seated in said socket and having an axial thrust engagement therewith, a spindle journalled in said bearing member and having an axial thrust engagement therewith, a second bearing member for said spindle axially spaced from said first-named bearing member, and means for angularly adjusting the axis of said spindle with respect to said supporting means.

15. A spindle mounting, comprising supporting means having a spherically formed socket, a bearing member pivotally seated in said socket means for holding said bearing member in axial thrust engagement with said spherically formed socket, a spindle rotatable in said bearing member, means for driving the spindle, and means for adjustably tilting the spindle with respect to said supporting means.

FRANK M. DAVIS.